(12) United States Patent
Brignac et al.

(10) Patent No.: US 6,231,754 B1
(45) Date of Patent: May 15, 2001

(54) HIGH TEMPERATURE NAPHTHA DESULFURIZATION USING A LOW METAL AND PARTIALLY DEACTIVATED CATALYST

(75) Inventors: Garland B. Brignac; John P. Greeley, both of Clinton, NJ (US); Thomas R. Halbert, Baton Rouge, LA (US); Craig A. McKnight, Sherwood Park (CA); Richard A. Demmin, Highland Park, NJ (US); Janet R. Clark, Baton Rouge, LA (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/455,885

(22) Filed: Dec. 6, 1999

Related U.S. Application Data

(63) Continuation-in-part of application No. 08/583,725, filed on Feb. 2, 1996, now Pat. No. 6,126,814.

(51) Int. Cl.[7] .................................................. C10G 45/04
(52) U.S. Cl. ...................... 208/217; 208/215; 208/216 R
(58) Field of Search .............................. 208/215, 216 R, 208/270

(56) References Cited

U.S. PATENT DOCUMENTS

| | | | |
|---|---|---|---|
| 4,149,965 | 4/1979 | Pine et al. | 208/216 R |
| 5,423,975 | 6/1995 | Sudhaker et al. | 208/216 R |
| 5,525,211 | 6/1996 | Sudhaker et al. | 208/217 |
| 5,906,730 | 5/1999 | Hatanaka et al. | 208/210 |
| 5,985,136 | * 11/1999 | Brignac | 208/216 R |

\* cited by examiner

*Primary Examiner*—Helane Myers
(74) *Attorney, Agent, or Firm*—Gerard J. Hughes

(57) ABSTRACT

A high temperature naphtha desulfurization process with reduced olefin saturation employs a partially spent and low metals content hydrodesulfurization catalyst having from 2–40% the activity of a new catalyst. The catalytic metals preferably include Co and Mo in an atomic ratio of from 0.1 to 1. The catalyst is preferably at least partially regenerable, has less than 500 wppm of a total of one or more of nickel, iron and vanadium and preferably has no more than 12 wt. % catalytic metal calculated as the oxide. This permits selective deep desulfurization, with reduced olefin saturation, low product mercaptan levels and little or need for downstream mercaptan removal.

23 Claims, No Drawings

HIGH TEMPERATURE NAPHTHA DESULFURIZATION USING A LOW METAL AND PARTIALLY DEACTIVATED CATALYST

CROSS-REFERENCE TO RELATED APPLICATION

This application is a continuation-in-part application of U.S. patent application Ser. No. 08/583,725 filed on Feb. 2, 1996 which was refiled as a Continuing Prosecution Application on Feb. 28, 1998 now U.S. Pat. No. 6,126,814.

BACKGROUND OF THE DISCLOSURE

1. Field of the Invention

The invention relates to selective naphtha desulfurization with reduced mercaptan formation and olefin saturation. More particularly, the invention relates to selectively removing sulfur compounds from a sulfur and olefin-containing naphtha feed, with reduced reversion mercaptan formation and olefin saturation, by reacting the feed with a hydrogen treat gas at a high temperature, in the presence of a low metal loaded, partially deactivated and at least partially regenerable hydrodesulfurization catalyst.

2. Background of the Invention

Future mogas sulfur specifications are being regulated through legislation to increasingly lower levels, due to environmental considerations. Sulfur specifications on the order of less than 150 wppm of total sulfur are likely near term, with values of no greater than 30 wppm of total sulfur possible in the not too distant future. Such sulfur specifications are without precedent and will require the production of low sulfur blend stock for the mogas pool. The primary sulfur sources in the mogas pool are the blend stocks derived from FCC naphthas, whose sulfur content can fall in the range of 1500–7000 wppm depending upon crude quality and FCC operation. Conventional fixed bed hydrodesulfurization can reduce the sulfur level of FCC naphthas to very low levels, but the severe conditions of temperature, pressure and hydrogen treat gas ratio results in significant octane loss, due to olefin loss from saturation. Selective hydrodesulfurization processes have been developed to reduce olefin saturation and concomitant octane loss. Such processes are disclosed, for example, in U.S. Pat. Nos. 4,149,965; 5,525,211; 5,243,975, and 5,906,730, some of which employ poisoned and permanently deactivated catalysts. The process disclosed in the '975 patent employs a deactivated resid catalyst loaded with at least 1% of nickel, iron and vanadium poisons. Besides introducing possible contaminants into the naphtha stream, this catalyst is not regenerable. On the other hand, the '211 patent teaches the use of a permanently deactivated catalyst composition containing alkali or alkaline metal. The process disclosed in the '965 patent teaches that the selectivity of a naphtha hydrodesulfurization catalyst for sulfur removal slightly increases over time. Catalyst deactivations of from 2 to 50% are disclosed. In these and in other processes, in the hydrodesulfurization reactor the $H_2S$ formed as a consequence of the hydrodesulfurization reacts with the feed olefins, to form mercaptan sulfur compounds, which are known as reversion mercaptans. The amount of these mercaptans formed during the process typically exceeds future fuel specifications for mercaptan sulfur and, in some cases, total sulfur. Accordingly, it is desirable to have a deep and selective desulfurization process, with reduced mercaptan reversion and octane loss without introducing contaminants into the process and preferably with a catalyst that has not been permanently deactivated.

SUMMARY OF THE INVENTION

The invention relates to a high temperature process for removing sulfur compounds from an olefin-containing naphtha feed, with reduced reversion mercaptan formation, by reacting the feed with a hydrogen treat gas in the presence of a low metals loaded, partially spent hydrodesulfirization catalyst and preferably one that is at least partially regenerable. Thus, the process of the invention comprises reacting a naphtha feed containing organic sulfur compounds and olefins, with a hydrogen treat gas in the presence of a low metals loaded and partially deactivated or spent hydrodesulfurization catalyst, at a temperature of from 305 to about 455° C., a pressure of from 60–600 psig., a hydrogen treat gas ratio of from 2000–4000 scf/b, and a space velocity of from 1–10 v/v/hr, to remove most of the organic sulfur compounds, with reduced olefin saturation and mercaptan formation. By low metals loaded catalyst is meant catalytic metal loadings of no more and preferably less than 12 wt. %, based on the weight of the catalytic metal oxide. The temperature is preferably at least 315° C., more preferably at least 330° C., still more preferably at least 340° C. and most preferably at least 355° C. Lower pressures are preferred. Thus, preferred pressures will range from about 60–500 psig. and more preferably no more than about 350 psig. Preferred treat gas rates range from 2500–4000 scf/b, with from 3000–4000 scf/b being more preferred. While the level of desulfurization will be at least 75 wt. % and preferably at least 85 wt. %, from 90–100 wt. % sulfur removal may be achieved to form a desulfurized naphtha product having a total sulfur level of from 5–500 wppm, including from 5–200 wppm of mercaptan sulfur, with a feed olefin loss of from 5–60 wt. %. By hydrogen treat gas is meant a gas comprising hydrogen, which may or may not contain one or more diluent gases which don't adversely affect the desulfurization catalyst, process or product. It is preferred that the treat gas comprise from 60–100 vol. % hydrogen. By organic sulfur compound is meant any sulfur bearing organic compound.

Preferably the catalyst will comprise not more than 10 and more preferably not more than 8 wt. % catalytic metal components calculated as their oxides, based on the total catalyst weight. The catalyst will comprise at least one catalytically active metal component of a metal from Group VIII, and preferably a catalytically active metal component of a non-noble metal from Group VIII and a metal from Group VIB, supported on a suitable support. Particularly preferred is a catalyst comprising CoO and $MoO_3$ on a support having a Co/Mo atomic ratio of from 0.1 to 1.0, which is explained in detail below. The catalyst is partially spent or deactivated (partially spent and partially deactivated are used herein synonymously), which means that it is neither a fresh catalyst having full desulfurization activity, nor is it a fully deactivated exhibiting essentially no desulfurization activity. The catalyst will have less than 50% and more than 1% of the hydrodesulfurization activity of a new or regenerated catalyst. The activity level will range from 2–40% and preferably from 5–25% of the activity of a new or regenerated catalyst. The catalyst may be presulfided or it may be sulfided in-situ, using conventional sulfiding procedures. It is also preferred that the catalyst be at least partially regenerable and neither permanently deactivated nor contain more than 500 wppm of non-regenerable poisons, such as compounds of nickel, iron and vanadium. The process of the invention is useful for deep and selective sulfur removal, with reduced olefin loss and mercaptan formation, particularly with a high sulfur content naphtha feed. By high feed sulfur content is meant from 0.1–0.7 wt.

% (1000–7000 wppm) of sulfur in the form of organic sulfur bearing compounds.

DETAILED DESCRIPTION

It is anticipated that environmentally driven regulatory pressure on motor gasoline (mogas) sulfur levels, will result in the widespread production of 150 wppm total sulfur mogas by the year 2000 and 30 wppm perhaps shortly thereafter. Further, gas oil and other feeds for a fluid cat cracker used to produce cat cracked naphthas, are increasingly using ever more amounts of poorer quality, high sulfur content components, due to the dwindling supply of higher quality crude oil sources. This results in higher sulfur contents in the cat cracked naphthas, which are the major source of naphtha stocks for mogas pools. Thus, the deep desulfurization and reduction in mercaptan reversion achieved by the selective hydrodesulfurizing process of the invention, is important with respect to the desulfurized product meeting both low total sulfur and mercaptan sulfur specifications, while preserving the olefins valuable for octane. At deep levels of desulfurization, especially from 90–100 wt. % sulfur removal, and particularly with relatively high sulfur content naphtha feeds (e.g., >500 wppm and particularly feeds having 1500–7000 wppm sulfur), the contribution of sulfur from reversion mercaptans to the total sulfur, can be significant. Therefore, the control of mercaptan formation is necessary to reach these very low sulfur levels of $\leq 150$ wppm, especially $\leq 30$ wppm.

The deep naphtha desulfurization and low mercaptan content of the desulfurized naphtha achieved by the combination of the relatively high desulfurization temperature, low metal content and low activity, or spent hydrodesulfurization catalyst employed in the process of the invention was unexpected, particularly at a conventional hydrodesulfurization pressures of about 300–500 psig. Thus, while lower pressures may be preferred, in many cases lower pressures may not be achievable, because it may drop the hydrogen partial pressure to an unsatisfactorily low level.

The organic sulfur compounds in a typical naphtha feed to be desulfurized, comprise mercaptan sulfur compounds (RSH), sulfides (RSR), disulfides (RSSR), thiophenes and other cyclic sulfur compounds, and aromatic single and condensed ring compounds. Mercaptans present in the naphtha feed typically have from one to three ($C_1$–$C_3$) carbon atoms. During the hydrodesulfurization process, the feed mercaptans are removed by reacting with the hydrogen, in the presence of one or more hydrodesulfurization catalysts, and forming $H_2S$ and paraffins. It is believed that the $H_2S$ produced in the reactor from the removal of organic sulfur compounds, reacts with the olefins to form new mercaptans (reversion mercaptans). Generally it has been found that the mercaptans present in the hydrodesulfurized product have a higher carbon number, than those found in the feed. These reversion mercaptans formed in the reactor, and which are present in the desulfurized product, typically comprise $C_{4+}$ mercaptans. Others have proposed reducing the mercaptan and/or total sulfur of the hydrodesulfurized naphtha product by means such as 1) pretreating the feed to saturate diolefins, 2) extractive sweetening of the hydrotreated product, and 3) product sweetening with an oxidant, alkaline base and catalyst. However, diolefin saturation requires an additional reactor vessel and has not been demonstrated as effective for reducing RSH formation. The higher carbon number mercaptans produced by the reversion reactions are difficult to extract into caustic. The third approach suggests sweetening the product by producing disulfides from the mercaptans, and therefore has no value in reducing the total sulfiur, as does the process of the invention.

Naphtha feeds or feedstocks useful in the process of the invention include petroleum naphthas, steam cracked naphthas, coker naphthas, FCC naphthas and blends and fractions thereof, with end boiling points typically below 230° C., and which typically contain 60 wt. % or less olefinic hydrocarbons, with sulfur levels as high as 3000 wppm and even higher (e.g., 7000 wppm). The naphtha feed, preferably a cracked naphtha feedstock, generally contains not only paraffins, naphthenes and aromatics, but also unsaturates, such as open-chain and cyclic olefins, dienes and cyclic hydrocarbons with olefinic side chains. The olefin content of a typical cracked naphtha feed can broadly range from 5–60 vol. %, but more typically from 10–40 vol. %. In the practice of the invention it is preferred that the olefin content of the naphtha feed be at least 15 vol. % and more preferably at least 25 vol. %. The diene concentration can be as much as 15 wt. %, but more typically ranges from about 0.2 wt. % to about 5 wt. % of the feed. High diene concentrations can result in a gasoline product with poor stability and color. Feed sulfur content will generally range from about 0.05 wt. % to about 0.7 wt. %. In the practice of the invention, it is preferred that the sulfur content range from 0.15–0.7 wt. %, preferably 0.2–0.7 wt. % and more preferably from about 0.3 to 0.7 wt. % (3000–7000 wppm), based on the total weight of the feed. The nitrogen content will generally range from about 5 wppm to about 500 wppm, and more typically from about 20 wppm to about 200 wppm.

The partially deactivated or spent hydrodesulfurization catalyst employed in the process of the invention will have a low loading of less than 12 wt. %, of the total catalyst, of at least one catalytically active metal component calculated as the oxide, of a metal from Group VIII on a suitable support and preferably a Group VIII non-noble metal component, combination with a component of at least one Group VIB metal, supported on a suitable, high surface area inorganic metal oxide support material such as, but not limited to, alumina, silica, titania, magnesia, silica- alumina, and the like. Alumina, silica and silica-alumina are preferred. All Groups of the Periodic Table referred to herein mean Groups as found in the Sargent-Welch Periodic Table of the Elements, copyrighted in 1968 by the Sargent-Welch Scientific Company. In contrast to the low catalytic metal loaded catalysts of the invention, catalytic metal component concentrations in conventional hydroprocessing catalysts and typically range from about 12–30 wt % of the metal oxide, and more typically from about 15–25 wt. % of the oxide of the catalytic metal components, based on the total catalyst weight. As mentioned above, the catalyst may be presulfided or sulfided in-situ, by well known and conventional methods. As mentioned above, the catalyst will preferably be at least partially regenerable, which means at least about 25% and more preferably regenerable to at least about 75% of the hydrodesulfurization activity of a new catalyst.

A low metal loaded hydrodesulfurization catalyst comprising CoO and $MoO_3$ on a support and having a Co/Mo atomic ratio of from 0.1 to 1.0 is particularly preferred. By low metal loaded is meant that the catalyst will contain not more than 12, preferably not more than 10 and more preferably not more than 8 wt. % catalytic metal components calculated as their oxides, based on the total catalyst weight. Such catalysts include: (a) a $MoO_3$ concentration of about 1 to 10 wt, %, preferably 2 to 8 wt. % and more preferably 4 to 6 wt. % of the total catalyst; (b) a CoO concentration of 0.1 to 5 wt. %, preferably 0.5 to 4 wt. % and more preferably 1 to 3 wt. % based on the total catalyst weight. The catalyst will also have (i) a Co/Mo atomic ratio of 0.1 to 1.0, preferably 0.20 to 0.80 and more preferably 0.25 to 0.72; (ii)

a median pore diameter of 60 to 200 Å, preferably from 75 to 175 Å and more preferably 80 to 150 Å; (iii) a MoO surface concentration of $0.5 \times 10^{-4}$ to $3 \times 10^{-4}$ g. $MoO_3/m^2$, preferably $0.75 \times 10^{-4}$ to $2.4 \times 10^{-4}$, and more preferably $1 \times 10^{-4}$ to $2 \times 10^{-4}$, and (iv) an average particle size diameter of less than 2.0 mm, preferably less than 1.6 mm and more preferably less than 1.4 mm. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity", S. J. Tauster, et al., J of Catalysis, 63, p. 515–519 (1980), which is incorporated herein by reference. The Oxygen Chemisorption Test involves edge- plane area measurements made wherein pulses of oxygen are added to a carrier gas stream and thus rapidly traverse the catalyst bed. The metal sulfide edge plane area of the catalyst, as measured by the oxygen chemisorption, will be from about 761 to 2800, preferably from 1000 to 2200, and more preferably from 1200 to 2000 $\mu$mol oxygen/gram $MoO_3$. Alumina is a preferred support. The supported, low metal loaded Co and Mo containing catalyst used in Example 3 below, met at least the broad ranges of all the catalyst parameters for the low metal loaded catalyst set forth in this paragraph. For catalysts with a high degree of metal sulfide edge plane area, magnesia can also be used. The catalyst support material will preferably contain less than 1 wt. % of contaminants such as Fe, sulfates, silica and various metal oxides which can be present during preparation of the catalyst. It is preferred that the catalyst be free of such contaminants. In one embodiment, the catalyst may also contain from up to 5 wt. %, preferably 0.5 to 4 wt. % and more preferably 1 to 3 wt. % of an additive in the support, which additive is selected from the group consisting of phosphorous and metals or metal oxides of metals of Group IA (alkali metals).

The one or more catalytic metals can be deposited incorporated upon the support by any suitable conventional means, such as by impregnation employing heat-decomposable salts of the Group VIB and VIII metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the catalytic metal hydrogenating components can be employed by incipient wetness, impregnation from aqueous or organic media, compositing. Impregnation as in incipient wetness, with or without drying and calcining after each impregnation is typically used. Calcination is generally achieved in air at temperatures of from 260–650° C., with temperatures from 425–590° C. typical.

The invention will be further understood with reference to the examples below.

EXAMPLES

Example 1

A spent batch of a commercially prepared, low metal loaded, high dispersion catalyst of the invention was used in this experiment, and consisted of 4.34 wt. % $MoO_3$ and 1.19 wt. % CoO on an alumina support. The spent catalyst was taken from the top bed of a hydrodesulfuirizing reactor used to desulfurize heavy cat cracker naphtha and its desulfurizing activity was between 10–20% of what it is when it was fresh. Analysis of the catalyst indicated that it also contained about 0.2 wt. % of arsenic as a consequence of the commercial desulfurization. The average catalyst particle size was about 1.3 mm and the feed to the reactor was a heavy cat naphtha containing 2813 wppm total sulfur, with a Bromine Number of 29.5, which represented 19 vol. % olefins. The catalyst was used as a fixed bed in an isothermal, downflow, all vapor-phase pilot plant reactor. The desulfurizing conditions in the reactor were 352–366° C., 100% hydrogen treat gas at a rate of 2600 scf/b, and 300 psig total inlet pressure. The space velocity was about 3.25 LHSV. Thus, the catalyst was that of the invention and the reaction conditions were within the broad reaction condition ranges of the invention. Overall sulfur removal was 89–93.4% and olefin saturation about 35%. Table 1 shows percent total desulfurization, total product sulfuir levels, and mercaptan sulfur levels. The 89.6% and 92.2% sulfur removal (HDS) were at 352° C., while the 92.4% was at 366° C. The data show that as little as a 4° C. temperature increase over 352° C. to 366° C., significantly reduced total product sulfur. It was determined that the presence of the arsenic on the catalyst produced the same results as normal carbon laydown during desulfurization. Therefore, except limiting the regenerability to about 25–30% of the fresh catalyst, the presence of the arsenic is believed not to have any adverse effect on the high temperature desulfurization. Consequently, but for the presence of the arsenic, the catalyst would have been almost fully regenerable to the activity of the fresh catalyst. No nickel, iron or vanadium was found.

TABLE 1

| Product Qualities at 352–366° C. and 300 psig | | | | | |
| --- | --- | --- | --- | --- | --- |
| Temp., ° C. | LHSV | % HDS | Total S, wppm | % Olefin Saturation | RSH, ppm |
| 352 | 3.32 | 89.6 | 292 | 34.9 | 7.1 |
| 352 | 3.14 | 92.2 | 220 | 36.2 | 5.3 |
| 366 | 3.26 | 96.2 | 106 | 45.7 | 5.0 |

As seen in Table 1, the high temperature and deep desulfurization of the invention significantly reduces mercaptan sulfur in the hydrodesulfurized product. The use of the combination of the low metals loaded, spent catalyst and high temperature reaction conditions of the invention, permits product desulfuirization and olefin saturation targets to be met, while maintaining acceptable olefin levels.

In this Example and in all of the Examples below, the % olefin saturation was determined by the % Bromine Number reduction.

Comparative Example A

A laboratory prepared, fresh batch of a low metal loaded, high dispersion catalyst in a 1.3 mm ASQ form, consisting of approximately 6.5 wt. % $MoO_3$ and 2.2 wt. % CoO on an alumina support, was used in this experiment and in the experiment below. Thus the catalyst composition was that of the invention, but the catalyst was fresh instead of being spent or partially deactivated. The feed was the same heavy cat naphtha feed used in Example 1, containing, 2813 wppm total sulfur, and 29.5 bromine number (19 vol. %) and the hydrodesulfurization reactor was an isothermal, downflow, all vapor-phase pilot plant reactor. Catalyst loading was 20 cc. The hydrodesulfurization reaction conditions used in this experiment were 260.5° C., a 100% hydrogen treat gas ratio of 2596 scf/b and a 300 psig total inlet pressure. The feed space velocity was 6.57 LHSV. Thus, while the catalyst was a low loaded catalyst containing the preferred catalytic metal components, it was not partially deactivated, and it and the low temperature therefore fall outside the scope of the invention. Overall sulfur removal was 88.1 wt. % and feed olefin saturation of 25.4%. Table 2 compares these results with results for the same fresh catalyst, feed and reactor, but a higher temperature which is still lower than the minimum of that used in the practice of the invention. It should be noted here, that modeling studies revealed that if the desulfurization temperature using the fresh catalyst is increased high enough to achieve the low total desulfurization levels achieved in Example 1, all of the olefins in the naphtha feed will be saturated. Thus, the high temperature hydrodesulfurizing regime of the invention cannot be used with the fresh catalyst.

Comparative Example B

This experiment was similar to Comparative Example A, using the same fresh catalyst, feed and reactor, etc., except for a higher temperature of 288° C., a 100% hydrogen treat gas at a ratio of 2629, scf/b, a space velocity of 7.6 LHSV and a 116 psig total reactor inlet pressure. The results are also set forth in Table 2, in which they can be readily compared with those obtained from Comparative Example A above. Thus, even with the higher temperature of 288° C. and lower pressure of 116 psig., the fresh catalyst was unable to achieve the low mercaptan content of the process of the invention. Modeling studies revealed that to Increase the temperature to 315° C. with the fresh catalyst, would saturate almost all (e.g., >85%) of the feed olefins.

TABLE 2

| Reaction Conditions | % HDS | % Olefin Saturation | Total S wppm | RSH, wppm |
|---|---|---|---|---|
| Example A (260° C., 306 psig) | 88.1 | 25.4 | 335 | 63 |
| Example B (288° C., 116 psig) | 90.3 | 23.7 | 212 | 15.7 |

Example 2

For this experiment, a fresh batch of the same commercially prepared, low metal loaded, high dispersion catalyst of the invention used in Example 1 and consisting of 4.34 wt. % MoO$_3$ and 1.19 wt. % CoO on an alumina support, with an average catalyst particle size was about 1.3 mm, was used in this experiment to desulfurize an intermediate cat cracker naphtha. The naphtha feed contained 992 wppm sulfur and had a Bromine Number of 51.3, which represented 30.8 vol. % olefins. As in the Examples above, the catalyst (about 20 cc) was used as a fixed bed in an isothermal, downflow, all vapor-phase pilot plant reactor. The hydrogen treat gas was a 60:40 vol. % mixture of hydrogen (60%) and methane (40%). The initial desulfurizing conditions in the reactor were a temperature of 274° C., a treat gas rate of rate of 1368 scf/b, and a 383 psig total inlet pressure. The space velocity of the naphtha feed was about 3.34 LHSV. As the reaction progressed over a period of several weeks, the temperature in the reactor was slowly increased up to a final temperature of 310.5° C. The final space velocity, pressure and treat gas rate were 3.3 LHSV, 378 psig and 1380 scf/b. An analysis of the spent catalyst at the end of the run revealed it to be free of metal deposits and the hydrodesulfurization activity was between about 15–20% of that of the fresh catalyst at the beginning of the run.

Thus, at the end of the run the catalyst was a spent catalyst of the invention and the reaction conditions were within the broad hydrodesulftirization reaction condition ranges of the invention. The results are shown in Table 3 below and, when compared to those at the start of the run of Comparative Example C, clearly demonstrate selectivity for desulfurization and a substantial reduction in the mercaptan level of the desulfurized naphtha.

Comparative Example C

This comparative Example relates to the extent of desulfurization, olefin saturation and the mercaptan content of the desulfurized naphtha product at the start of the run described above as Example 2, when the catalyst was fresh. Thus, the initial temperature of 274° C. used at the start of the run when the catalyst was fresh and the fresh catalyst itself, are both outside the scope of the invention. The hydrodesulfurization results at the start of the run are also set forth in Table 3, as a comparison to those obtained at the end of the run, when both the catalyst and reaction temperature were within the scope of the invention.

TABLE 3

| Temp., ° C. | % HDS | Total S, wppm | % Olefin Saturation | RSH, ppm |
|---|---|---|---|---|
| Example 2 310.5 | 79.0 | 208 | 16.8 | 14.0 |
| Example C 274 | 83.5 | 164 | 20.5 | 53.4 |

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertain

What is claimed is:

1. A single-stage process for desulfurizing a sulfur and olefin-containing naphtha feed, comprising reacting said feed with a hydrogen treat gas in the presence of a low metals loaded spent hydrodesulfurization catalyst, at a temperature of from 305 to 455° C., a pressure of from 60–600 psig, a hydrogen treat gas ratio of from 2000–4000 scf/b, wherein the process is operated in the vapor phase.

2. A process according to claim 1 wherein said catalyst comprises at least one Group VIII catalytic metal component and a catalyst support component.

3. A process according to claim 2 wherein said at least one catalytic metal component, calculated as the metal oxide, is present in said catalyst in an amount of less than 12 wt. %, based on the total catalyst weight.

4. A process according to claim 3 wherein said catalyst can be regenerated to restore at least a portion of its catalytic activity.

5. A process according to claim 4 wherein said catalyst contains a Group VIB and a catalytic metal component of a non-noble Group VIII metal.

6. A process according to claim 5 wherein said spent catalyst has a hydrodesulfurization level of from 2–40% of that of a new catalyst.

7. A process according to claim 5 wherein said naphtha feed contains from 5 to 60 wt. % olefins and from 0.1–0.7 wt. % total sulfur.

8. A process according to claim 6 wherein at least 75 wt. % of said total feed sulfur is removed and wherein no greater than 60 wt. % of said feed olefins are saturated.

9. A process according to claim 8 wherein said reaction conditions include a temperature of at least 315° C., a pressure of from 60–500 psig, and a hydrogen treat gas ratio of from 2500–4000 scf/b and wherein at least 80 wt. % of said feed sulfur is removed.

10. A process according to claim 9 wherein said Group VIB catalytic metal component includes a component of at least one of at least one of Mo and W and wherein said Group VIII catalytic metal component includes at least one of Co and Ni.

11. A process according to claim 10 wherein said total feed sulfur ranges from 0.2–0.7 wt. %.

12. A process according to claim 11 wherein said naphtha feed contains from 25–60 wt. % olefins, of which no more than 50% are saturated during said hydrodesulfurization.

13. A process according to claim 12 wherein said total feed sulfur ranges from 0.2–0.7 wt. % and wherein at least 90% of said feed sulfur is removed.

14. A process according to claim 13 wherein at least 95 wt. % of said total feed sulfur is removed during said hydrodesulfurization.

15. A process according to claim 14 wherein said reaction conditions include a temperature of from 340–425° C., a pressure no greater than 350 psig, and a hydrogen treat gas ratio of from 3000–4000 scf/b.

16. A process according to claim 15 wherein said feed contains at least 0.3 wt. % sulfur and wherein no more that 30 wt. % of said feed olefins are saturated during said hydrodesulfurization.

17. A process for desulfurizing a sulfur and olefin-containing naphtha feed with reduced mercaptan formation, comprising reacting said feed with hydrogen, in the presence of a spent and at least partially regenerable hydrodesulfurizing catalyst having a hydrodesulfurization activity of from 2–40% of a new catalyst and contains no more than a total 500 ppm of one or more of nickel, iron and vanadium, at reaction conditions including a temperature of from 305 to 455° C., a pressure of from 60–600 psig, and a hydrogen treat gas ratio of from 2000–4000 scf/b, wherein said catalyst comprises a Mo catalytic component, a Co catalytic component and a support component which comprises alumina, with said Mo component being present in an amount of from 1 to 10 wt. % calculated as $MoO_3$ and said Co component being present in an amount of from 0.1 to 5 wt. % calculated as CoO, with a Co/Mo atomic ratio of 0.1 to 1, wherein the total amount of said Mo and Co catalytic components, calculated as $MoO_3$ and CoO is no greater than 12 wt. % of said catalyst, wherein said naphtha feed contains up to 0.7 wt. % total sulfur and up to 60 wt. % olefins, wherein said hydrodesulfurization reduces said feed sulfur by at least 75 wt. %, with no more than 60 vol. % saturation, and wherein the process is operated in the vapor phase.

18. A process according to claim 17 wherein the total amount of said catalytic components is no greater than 10 wt. % of said catalyst, wherein the concentration of said Mo component, calculated as $MoO_3$ ranges from 2–8 wt. % of said catalyst and the concentration of said Co component calculated as CoO ranges from 0.5–4 wt. %.

19. A process according to claim 18 wherein said feed contains at least 10 wt. % olefins and at least 0.2 wt. % total sulfur and wherein less than 50% of said feed olefins are saturated.

20. A process according to claim 19 wherein the total amount of said catalytic components is no greater than 8 wt. % of said catalyst, wherein the concentration of said Mo component, calculated as $MoO_3$ ranges from 4–6 wt. % of said catalyst and the concentration of said Co component calculated as CoO ranges from 1–3 wt. %.

21. A process according to claim 20 wherein wherein said reaction conditions include a temperature of from 340–425° C., a pressure of no more than 350 psig, a hydrogen treat gas ratio of from 2500–4000 scf/b and wherein at least 90 wt. % of said feed sulfur is removed.

22. A process according to claim 21 wherein said feed contains at least 25 wt. % olefins and at least 0.3 wt. % total sulfur and wherein less than 30% of said feed olefins are saturated.

23. A process according to claim 22 wherein said reaction conditions include a temperature of from 370–425° C. and a hydrogen treat gas ratio of from 3000–4000 scf/b.

* * * * *